(12) United States Patent
McCanna (10) Patent No.: US 8,033,229 B1
(45) Date of Patent: Oct. 11, 2011

(54) ADJUSTABLE VIDEO AND STILL IMAGE PROJECTOR STAND

(76) Inventor: Chuck McCanna, Boca Raton, FL (US)

(*) Notice: Subject to any disclaimer, the term of this patent is extended or adjusted under 35 U.S.C. 154(b) by 188 days.

(21) Appl. No.: 12/498,817

(22) Filed: Jul. 7, 2009

Related U.S. Application Data (60) Provisional application No. 61/078,465, filed on Jul. 7, 2008.

(51) Int. Cl.
*A47B 9/00* (2006.01)

(52) U.S. Cl. .......... 108/145; 108/1; 108/5; 108/144.11; 248/371; 248/176.1; 248/176.3; 248/274.1; 248/188.2; 248/346.06

(58) Field of Classification Search .......... 248/346.01, 248/346.03, 346.06, 371, 133, 138, 396, 248/157, 176.1, 176.3, 188.1, 188.2, 241, 248/274.1, 309.1, 454, 372.1; 108/145, 144.11, 108/1, 5, 8, 20, 72, 179; 353/119
See application file for complete search history.

(56) References Cited

U.S. PATENT DOCUMENTS

| | | | |
|---|---|---|---|
| 5,720,591 A * | 2/1998 | Ledet ........................ | 414/778 |
| 6,637,350 B2 | 10/2003 | McKsymick | |
| 7,637,468 B2 * | 12/2009 | Huang ....................... | 248/421 |
| 7,901,091 B2 * | 3/2011 | Chen et al. ............... | 353/119 |
| 2002/0125662 A1 * | 9/2002 | Magness .................. | 280/30 |
| 2006/0289715 A1 | 12/2006 | Tsuboi | |
| 2007/0034125 A1 | 2/2007 | Lo | |
| 2011/0075350 A1 * | 3/2011 | Lindblad et al. ......... | 361/679.41 |

* cited by examiner

*Primary Examiner* — Terrell Mckinnon
*Assistant Examiner* — Todd M. Epps
(74) *Attorney, Agent, or Firm* — David P. Lhota, Esq.; Malin Haley DiMaggio Bowen & Lhota, P.A.

(57) ABSTRACT

An adjustable projector stand is provided for supporting a video or still image projector. The projector stand is adjustable in pitch and tilt for positioning and leveling images projected on a screen in a manner that compensates for uneven support structures, such as tilted tables and poorly placed screens. The device may be powered manually by the user or by battery through the use of a motor. The projector stand generally consists of a platform with two legs, each of which is formed by two pivotally joined rods. Each leg is in direct rotational communication with a threaded rod disposed within the platform. Each rod is in turn coupled to a means for rotation, which may consist of a manually rotated knob or a battery powered motor. The raising and lowering of one leg may be performed independent of the other in order to allow the projector stand to be leveled on an uneven surface.

7 Claims, 13 Drawing Sheets

ADJUSTABLE VIDEO AND STILL IMAGE PROJECTOR STAND

CROSS REFERENCE TO RELATED APPLICATIONS

This application claims the benefit of provisional patent application Ser. No. 61/078,465 filed Jul. 7, 2009.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

1. Field of the Invention

This invention relates generally to a projector support, and more particularly, to an adjustable video and, or still image projector stand that is adjustable in pitch and tilt for positioning and leveling images projected on a screen in a manner that compensates for uneven support structures, such as tilted tables and poorly placed screens.

2. Description of the Background Art

Still photograph and video projectors that project images on a remote screen are commonly used for doing presentations in classrooms, in meetings, at conferences and the like. A projector must typically be elevated to ensure the images are projected fully on the screen. Currently, people use books and other items to prop up the projector to the right height and angle so the images appear properly on the screen. Oftentimes it is difficult and tedious to find the right height and angle and requires numerous adjustments of the projector and support structure, such as a table. Needless to say, this is highly rudimentary and inconvenient. If there existed a single device that could conveniently and easily adjust the height and angle of a projector in a matter of seconds it would fully resolve these issues and be well received.

Unfortunately, there are no known devices that adequately and effectively adjust the height and angle of conventional projectors. The stands known consist of projector and computer stands that are complicated in structure and impractical or do not provide for vertical and horizontal adjustment, as contemplated by the instant invention. For instance, U.S. Patent Application Publication 2007/0034125, filed by Lo, discloses a hidden electric power elevating stand having crossing braking rods, a transversal rod and bearings. The Lo design is overly complex and comprises too many moving parts. U.S. Patent Application Publication 2006/0289715, filed by Tsuboi, discloses a projector stand having swivel-like base that regulates inclinations along a horizontal plane and a direction perpendicular to the projective direction within a prescribed angular range. The Tsuboi projector stand is limited in the amount of adjustments that can be made, changes the angle of projection which can affect the quality of the projection and can be unstable. U.S. Pat. No. 6,637,350, issued to McKsymick, discloses a portable compact computer and projector stand consisting of a table with telescopic legs. This design is bulky, complex and not conveniently portable. As the background devices fail to adequately and effectively address the aforementioned issues, there exists a need for an adjustable projector perch as contemplated by the instant invention disclosed herein.

BRIEF SUMMARY OF THE INVENTION

In light of the foregoing, it is an object of the present invention to provide a manually adjustable projector stand.

It is also an object of the instant invention to provide an adjustable projector stand with a motorized raising and lowering mechanism.

It is another object of the instant invention to provide a manually adjustable to projector stand wherein one side of the stand may be adjusted separately from the other in order to account for an uneven resting surface.

It is an additional object of the instant invention to provide a motorized adjustable projector stand wherein one side of the stand may be adjusted separately from the other in order to account for an uneven resting surface.

In light of these and other objects, the instant invention comprises a projector stand that is adjustable in pitch and tilt for positioning and leveling images projected on a screen in a manner that compensates for uneven support structures, such as tilted tables and poorly placed screens. The device may be powered manually or electrically through the use of a motor. The projector stand generally consists of a platform with two legs, each of which is formed by two pivotally joined rods. Each is in direct rotational communication with a threaded rod disposed within the platform. Each rod is in turn coupled to a means for rotation, which may consist of a manually rotated knob or an electrically powered motor. The raising and lowering of the legs may be performed independent of each other in order to allow the projector stand to be leveled on an uneven surface.

In accordance with these and other objects, which will become apparent hereinafter, the instant invention will now be described with particular reference to the accompanying drawings.

DETAILED DESCRIPTION OF THE INVENTION

With reference to the drawings, FIGS. 1 to 20 depict the preferred and alternative embodiments of the instant invention which is generally referenced as a projector stand, stand and, or by numeric character 10 or 110. The instant invention comprises a portable, collapsible, projector stand device that may be used on virtually any surface, such as an unlevel table top, to project still or video images onto the center of a screen.

As shown in FIGS. 1-9, the projector stand 10 permits the adjustment of the stand 10 up, down, and side to side. The instant invention 10 eliminates the need for books and other items to prop up a projector and enables the leveling of the projector when placed on an unlevel surface for perfect centering of the projected image on a screen every time.

Figure 1:
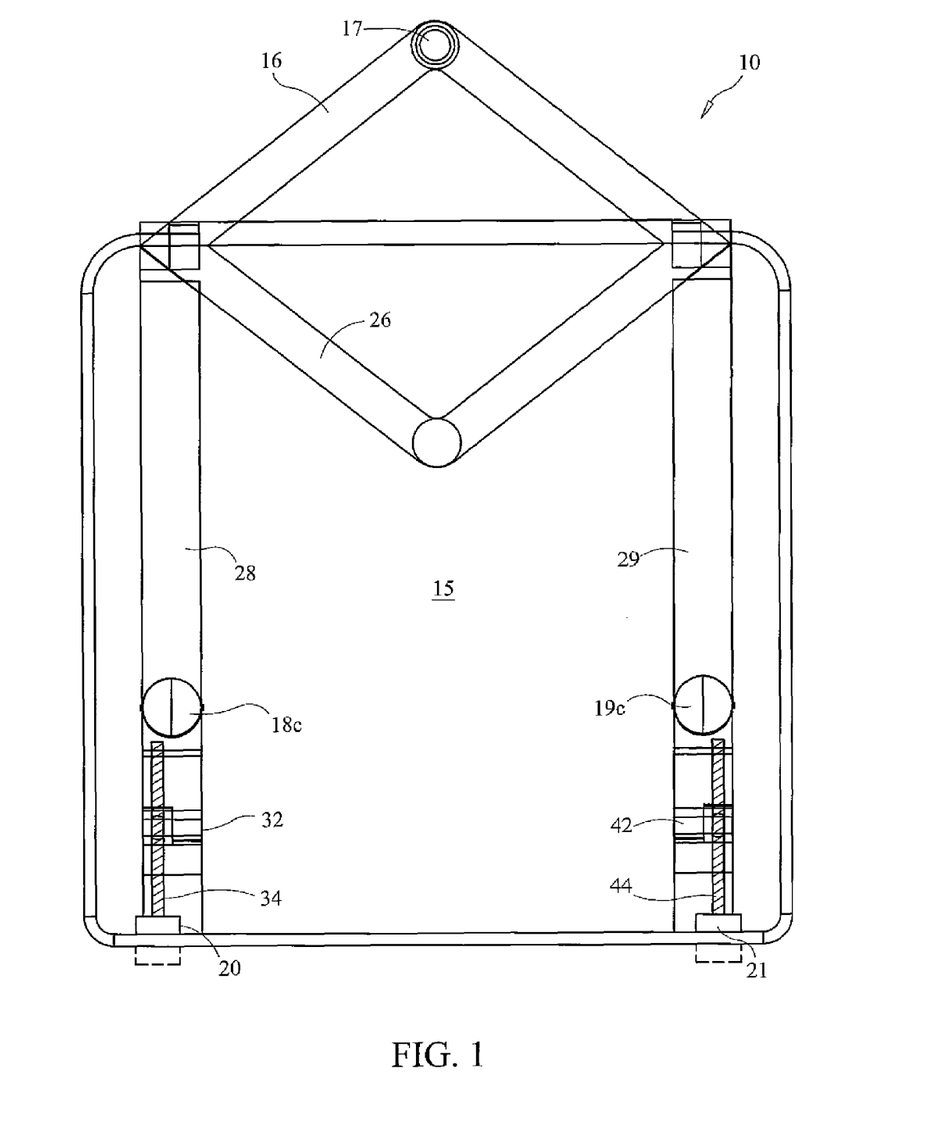
FIG. 1 is a bottom elevational partial cut-away view of the preferred embodiment of the adjustable projector stand with the stabilizer and legs extended and illustrating the leg channels and leg driver mechanisms in accordance with the instant invention.
Figure 2:
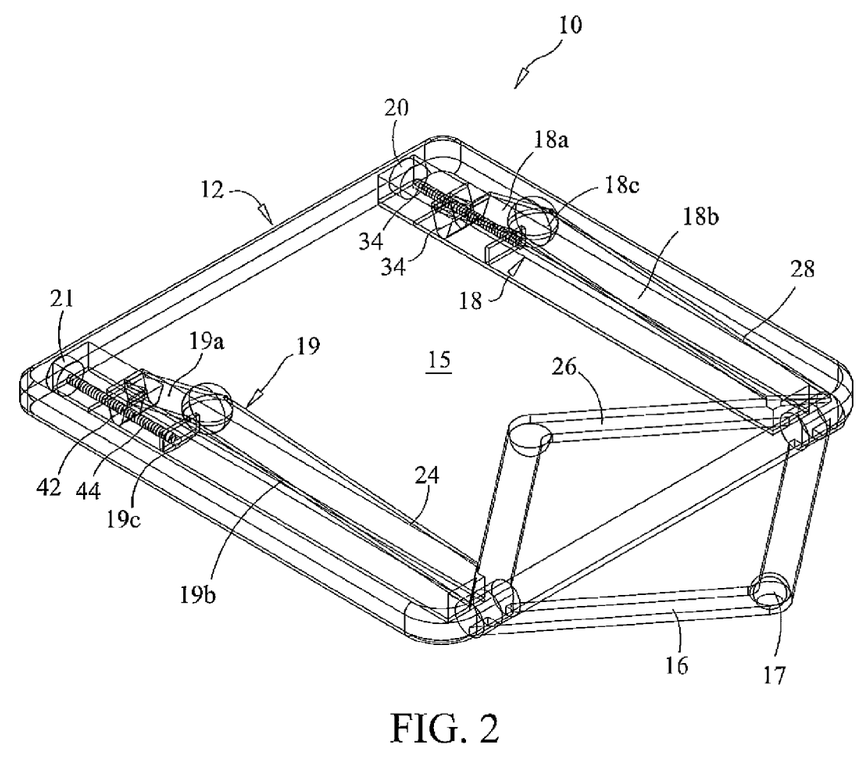
FIG. 2 is a top perspective cut-away view of the preferred embodiment of the adjustable projector stand with the stabilizer and legs retracted in accordance with the instant invention.
Figure 3:
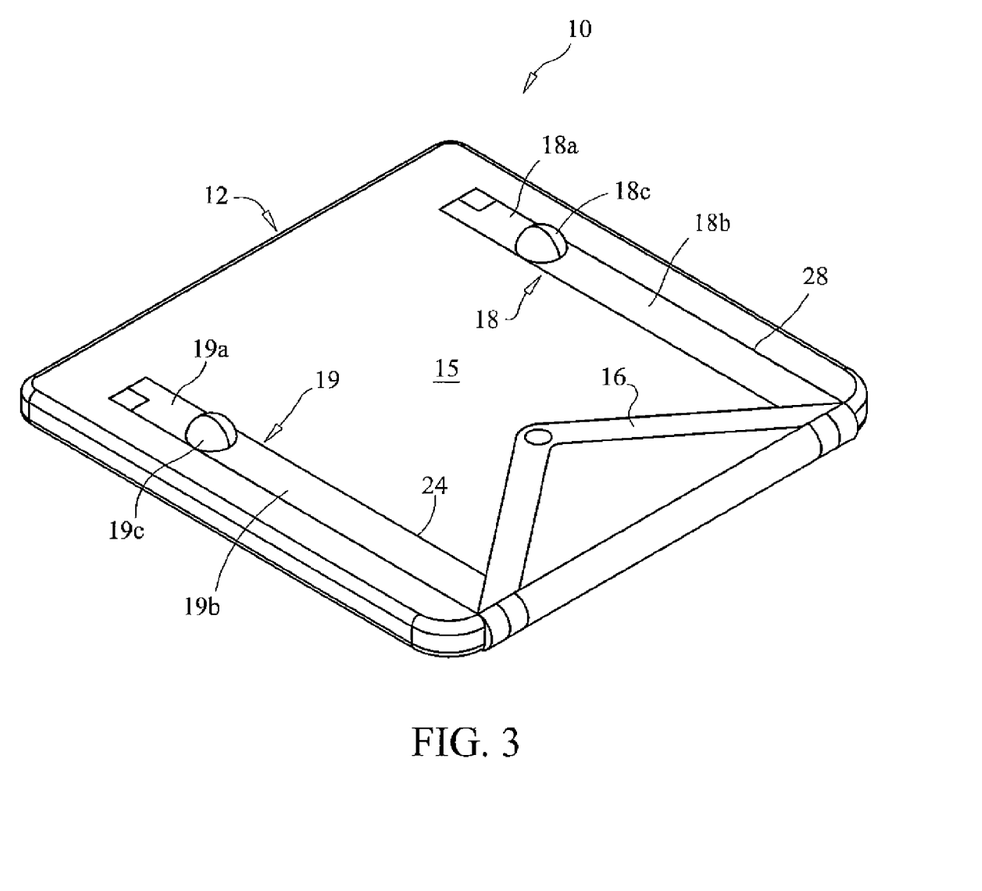
FIG. 3 is a bottom perspective view of the preferred embodiment of the adjustable projector stand with the stabilizer and legs retracted in accordance with the instant invention.
Figure 4:
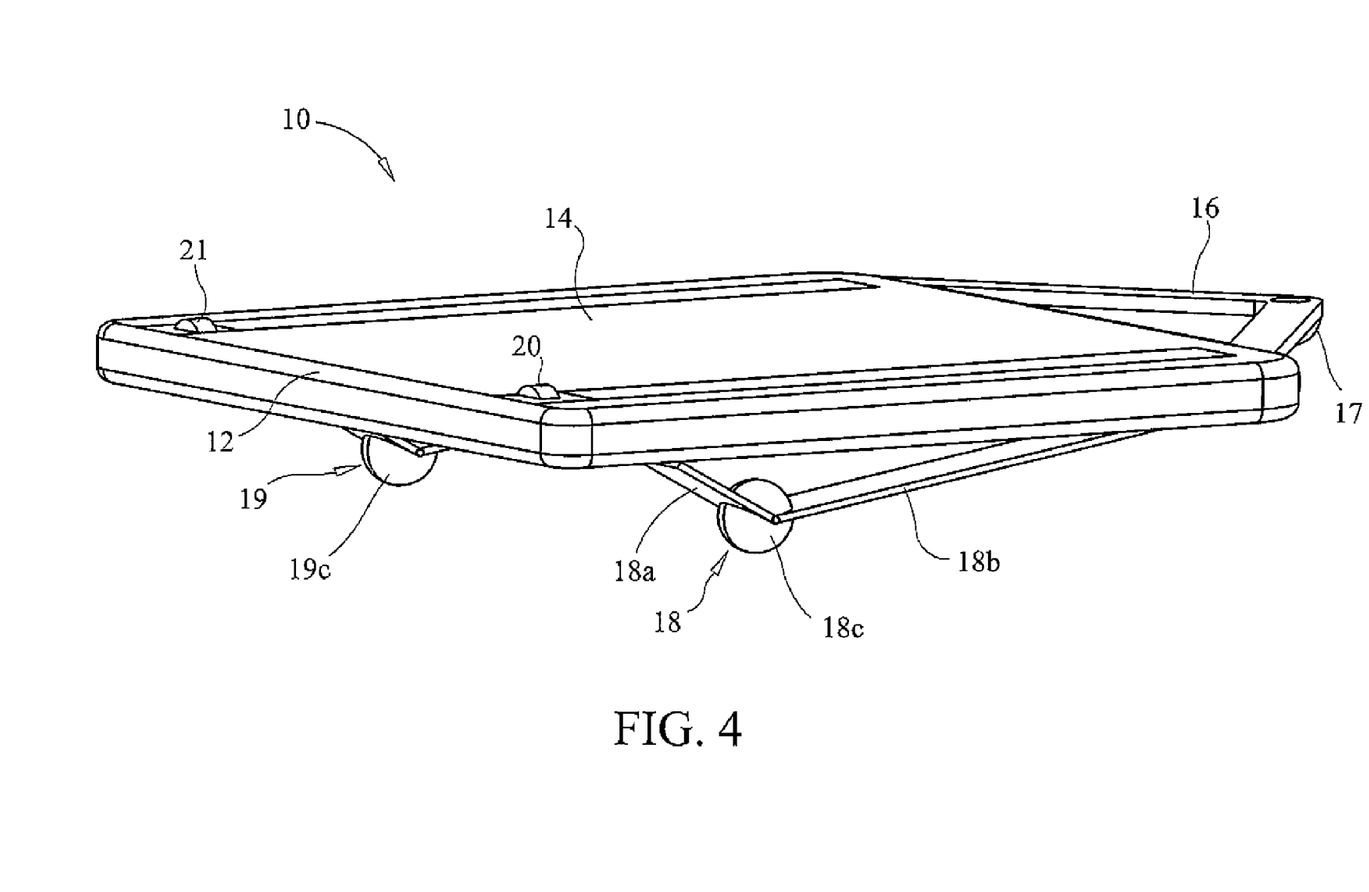
FIG. 4 is a front perspective view of the preferred embodiment of the adjustable projector stand with the stabilizer and legs extended in accordance with the instant invention.
Figure 5:
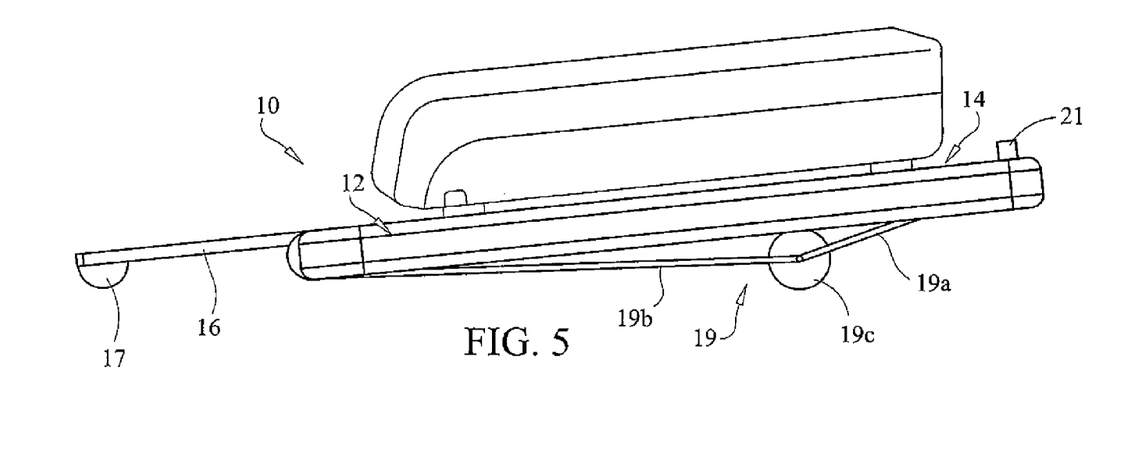
FIG. 5 is a side elevational view of the preferred embodiment of the adjustable projector stand with the stabilizer and legs extended in accordance with the instant invention.
Figure 6:
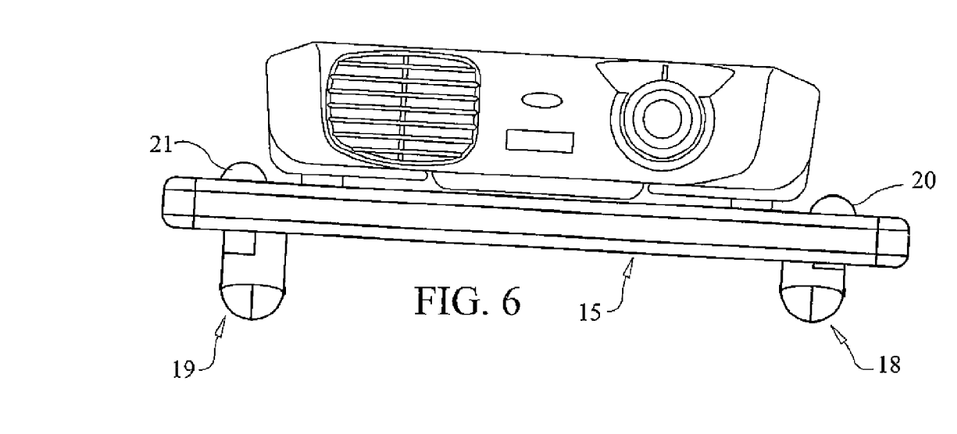
FIG. 6 is a front elevational view of the preferred embodiment of the adjustable projector stand with the stabilizer refracted and legs extended illustrating the stand in a tilted position, such as when placed on a tilted surface, in accordance with the instant invention.
Figure 7:
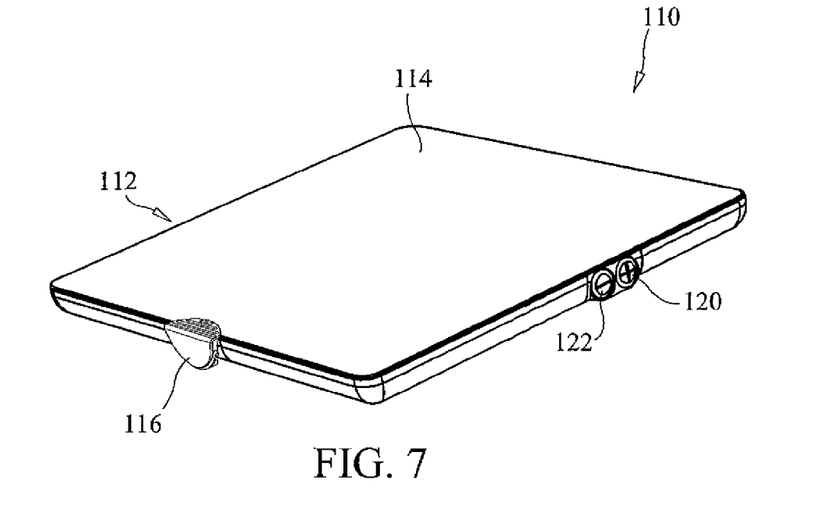
FIG. 7 is a perspective view of the alternative embodiment of the adjustable projector stand with the stabilizer and legs retracted in accordance with the instant invention.
Figure 8:
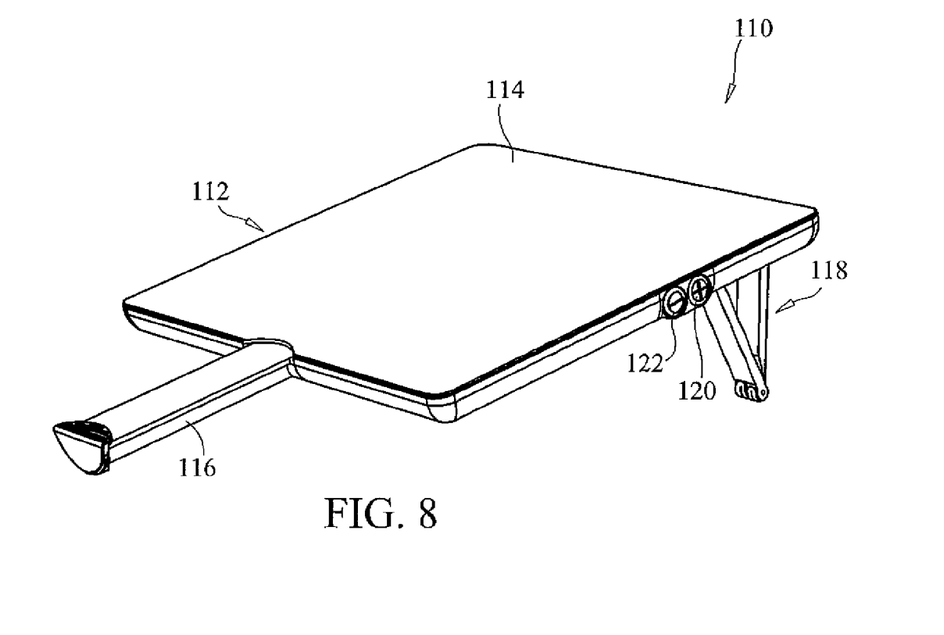
FIG. 8 is a perspective view of the alternative embodiment of the adjustable projector stand with the stabilizer and legs extended in accordance with the instant invention.
Figure 9:
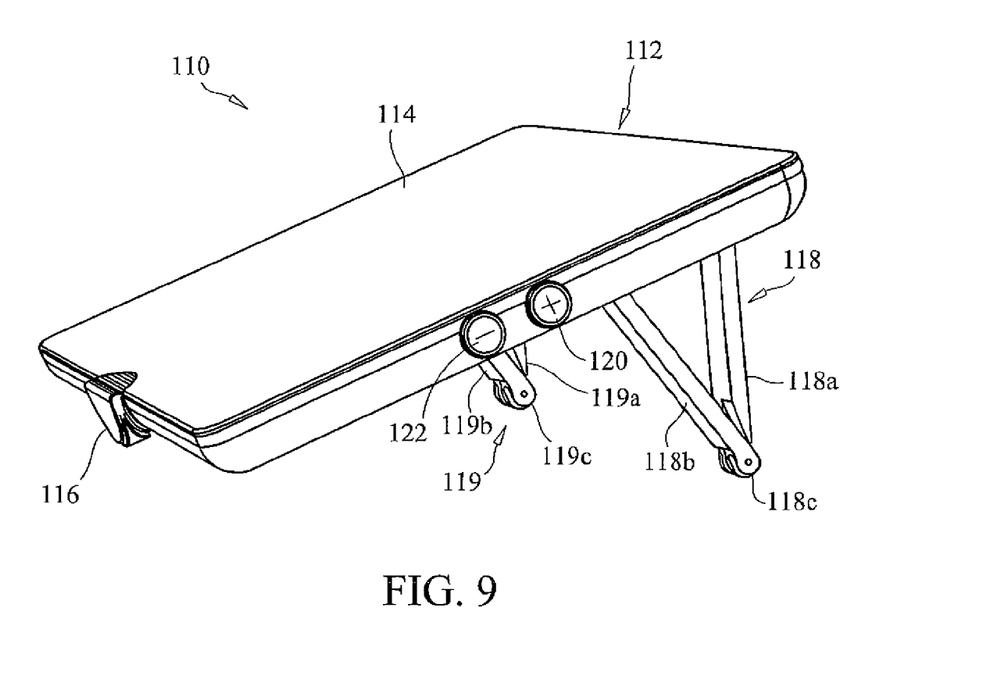
FIG. 9 is a perspective view of the alternative embodiment of the adjustable projector stand with the stabilizer retracted and the legs extended in accordance with the instant invention.

With reference to FIGS. 1-6, the preferred embodiment of the projector stand 10 comprises a flat housing 12 having an upper surface or platform 14 and bottom surface 15 and secures a stabilizer arm 16, first adjustable leg 18, second adjustable leg 19, first knob 20 for retracting and extending the first leg 18, second knob 21 for retracting and extending the second leg 19, first leg drive system 30 disposed in a first channel 28 formed in the lower surface 15 of the housing 12, second leg drive system 40 disposed in a second channel 29 formed in the lower surface 15 of the housing 12 and tactile adjustment knobs 20 and 21 in mechanical communication with the drive systems 30,40 for rotating the drive systems 30, 40 to extend and retract the legs 18, 19. The platform 14 is flat and can support a still picture or video projector, computer or other device that projects images. The first and second knobs 20 and 21 may project from the top or extend from the back of the housing 12. The knobs 20, 21 are manipulated to lower, raise and, or level the platform 14 by imparting independent rotational movement on the drive systems 30, 40 to adjust the respective heights of the legs 18, 19 for achieving the desired horizontal balance and projection height. The stabilizer arm 16 is hinged to the back end of the housing 12 and foldable into a recessed storage channel 26 formed in the bottom surface 15 of the housing 12 for storage and transport of the projector stand 10. The stabilizer arm 16 is pivoted outward from the storage channel 26 for stabilizing the stand 10. The stabilizer 16 preferably comprises a rubber or rubber-like cap 17 on the end of the stabilizer 16 for preventing it from sliding. The legs 18, 19 are retractable into the channels 30, 40, respectively, for storage and transport of the stand 10 and extendable from the channels 30, 40, respectively, for raising, lowering and leveling the stand 10. When the stand 10 is placed on an unlevel support surface, such as a table top, the legs 18, 19 are placed in different positions relative to each other by manipulating the knobs 20, 21 so as to adjust the height of their respective corners until the platform 14 is level, as shown in FIGS. 4-6.

With reference to FIGS. 1-4, the first leg 18 comprises a first rod 18a pivotally connected to a fixed second rod 18b by a hinge or hinge pin 18c, the second leg 18 comprises a first rod 19 pivotally connected to a fixed second rod 19b by a hinge or hinge pin 18c, the first drive system 30 comprises a first adjustment knob 20 and first threaded rod 34 and the second drive system 40 comprises a second adjustment knob 21 and second threaded rod 44. The first threaded rod 34 is fixed to the first knob 20 such that the rod 34 is rotated clockwise or counterclockwise depending on the direction of rotation of the first knob 20 as dictated by the user. Likewise, the second threaded rod 44 is fixed to the second knob 21 such that the rod 44 is rotated clockwise or counterclockwise depending on the direction of rotation of the second crank lever 21 as dictated by the user. The first leg rod 18a is rotatably secured in the first channel 30 and threadably mated to the first threaded rod 34 such that it moves along the rod 34 toward the fixed rod 18b when the threaded rod 34 is rotated in one direction to extend the first leg 18 and moves away from the fixed rod 18b when the threaded rod 34 is rotated in the opposite direction to retract the first leg 18. Likewise, the first leg rod 19a of the second leg 19 is rotatably secured in the second channel 40 and threadably mated to the second threaded rod 44 such that it moves along the rod 44 toward the fixed rod 19b when the threaded rod 44 is rotated in one direction to extend the second leg 19 and moves away from the fixed rod 19b when the threaded rod 44 is rotated in the opposite direction to retract the second leg 19. The first knob 20 resembles a standard rotatable kno that is hand-operated to turn the rod 34 in one direction for extending the first leg 18 to raise one side of the stand 10 and turn the rod 34 in an opposite direction for 15 retracting the first leg 18 into the channel 30 to lower the one side. Likewise, the second knob 21 resembles a standard rotatable knob that is hand-operated to turn the second rod 44 in one direction for extending the second leg 19 to raise the opposite side of the stand 10 and to turn the rod 44 in an opposite direction for retracting the second leg 19 into the second channel 40 to lower the same opposite side. When the stand 10 is placed on an unlevel surface the legs 18, 19 would be offset to level the platform 14.

Figures 10, 11:
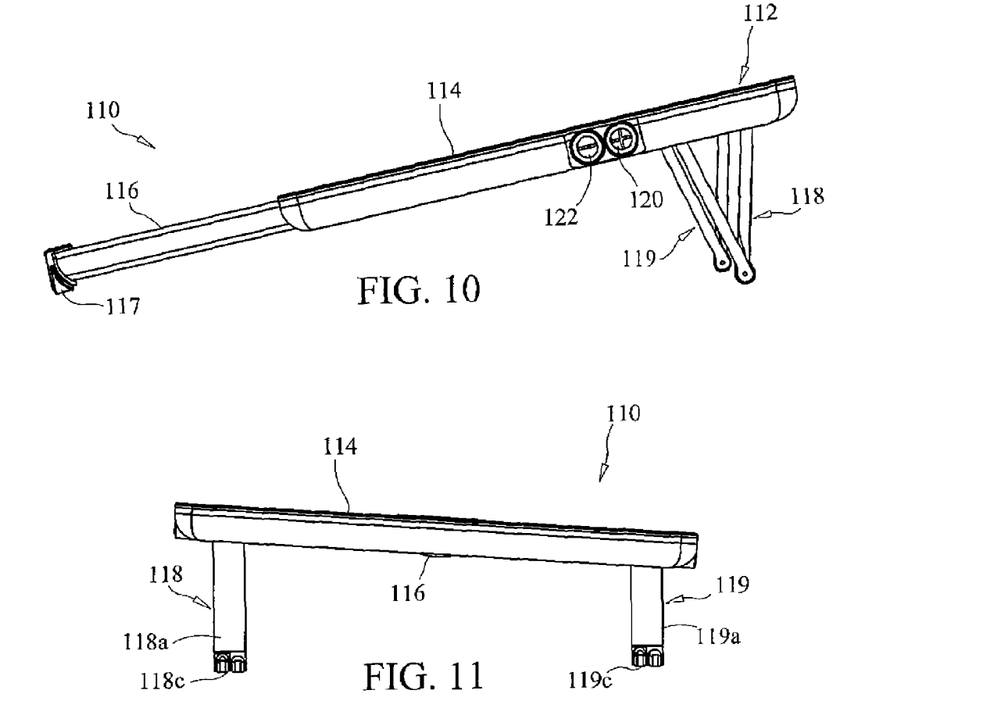
FIG. 10 is a side elevational view of the alternative embodiment of the adjustable projector stand with the stabilizer and legs extended in accordance with the instant invention.
FIG. 11 is a front elevational view of the alternative embodiment of the adjustable projector stand with the stabilizer refracted and legs extended illustrating the stand in a tilted position, such as when placed on a tilted surface, in accordance with the instant invention.
Figure 12:
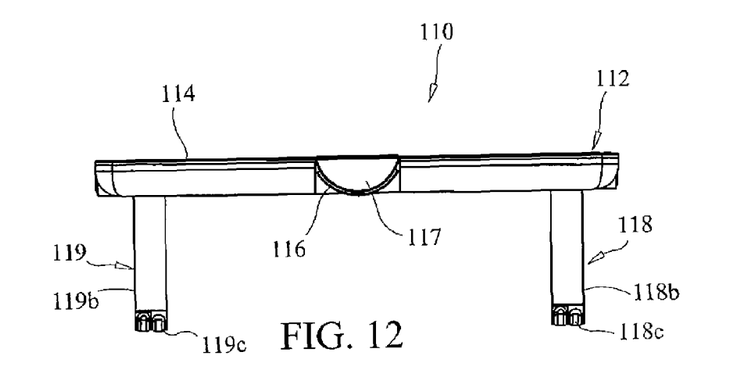
FIG. 12 is a rear elevational view of the alternative embodiment of the adjustable projector stand with the stabilizer retracted and legs extended illustrating the stand in a level position in accordance with the instant invention.
Figure 13:
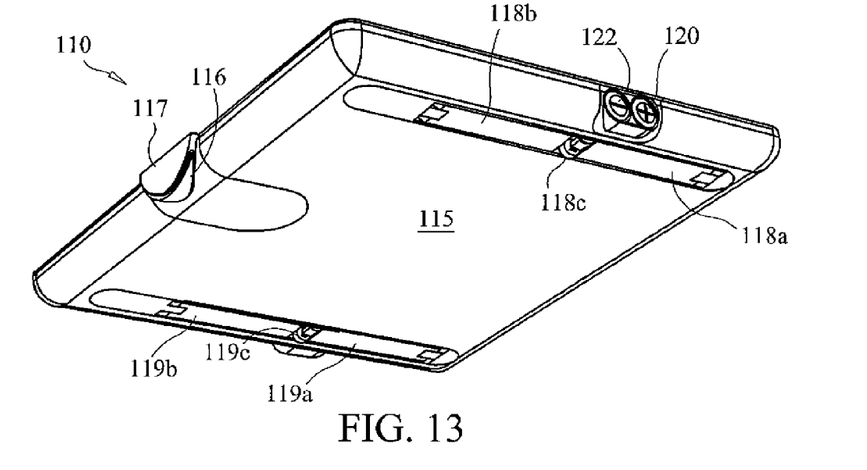
FIG. 13 is a bottom perspective view of the alternative embodiment of the adjustable projector stand with the stabilizer and legs retracted in accordance with the instant invention.
Figure 14:
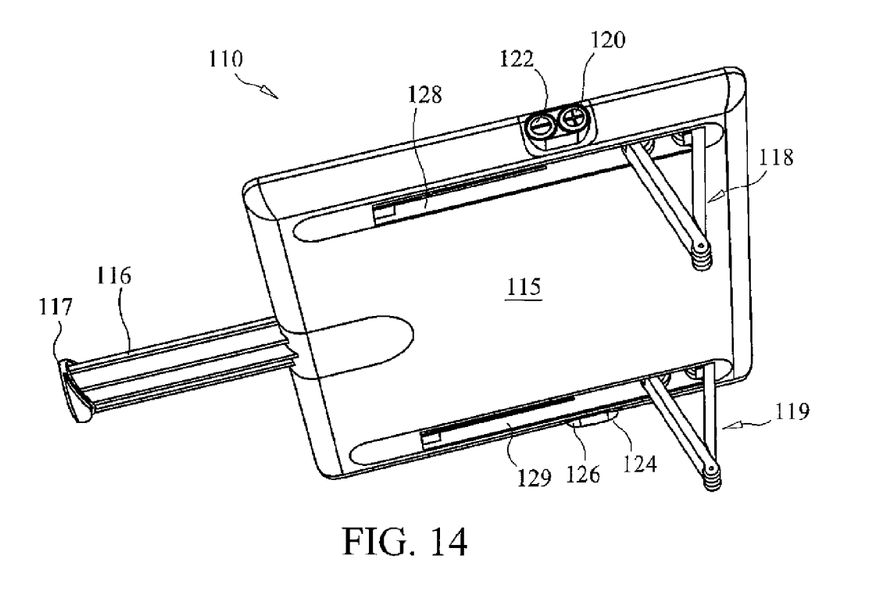
FIG. 14 is a bottom perspective view of the alternative embodiment of the adjustable projector stand with the stabilizer and legs extended in accordance with the instant invention.
Figure 15:
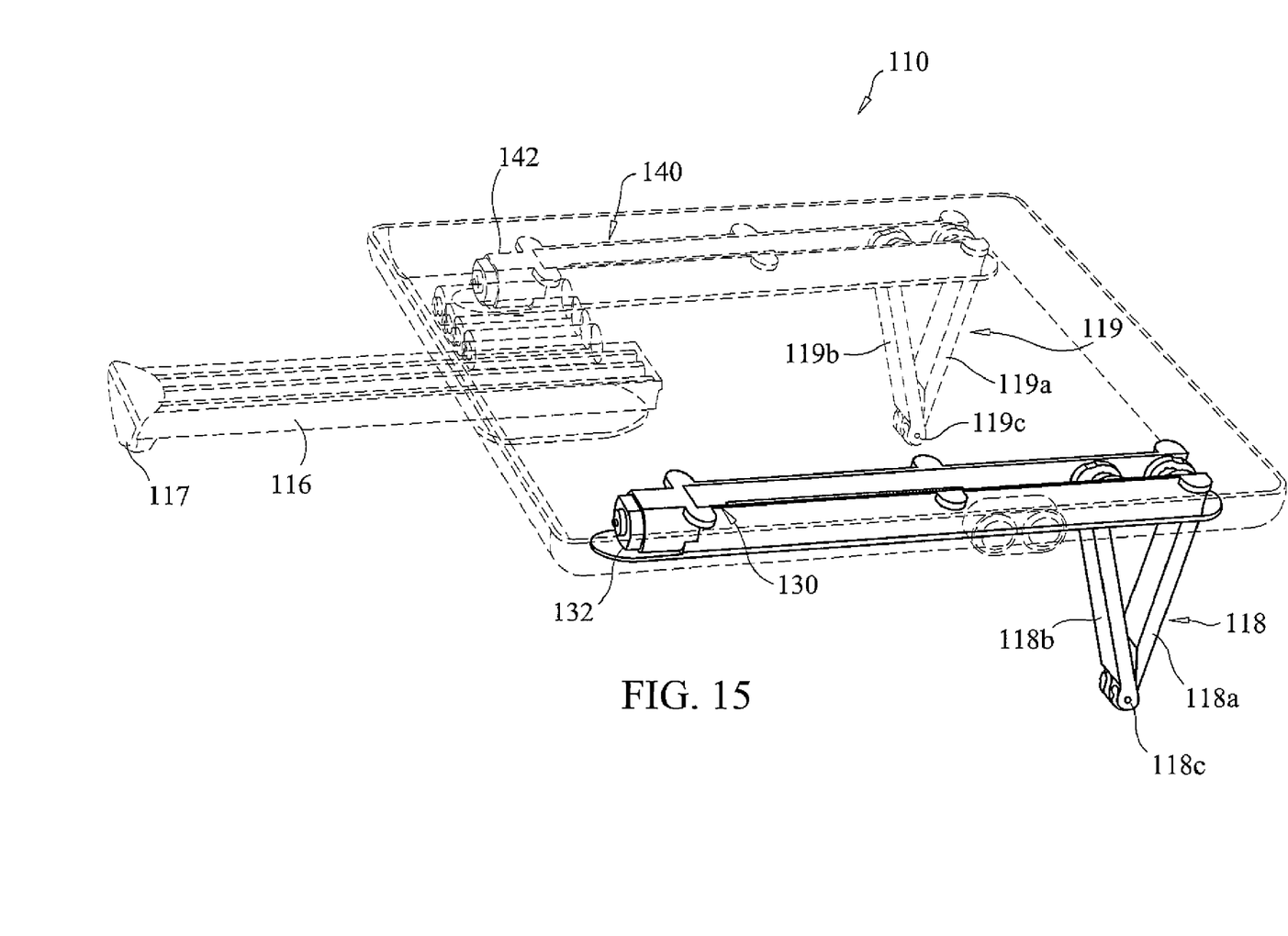
FIG. 15 is a top perspective cut-away view of the alternative embodiment of the adjustable projector stand with the stabilizer and legs extended in accordance with the instant invention.
Figure 16:
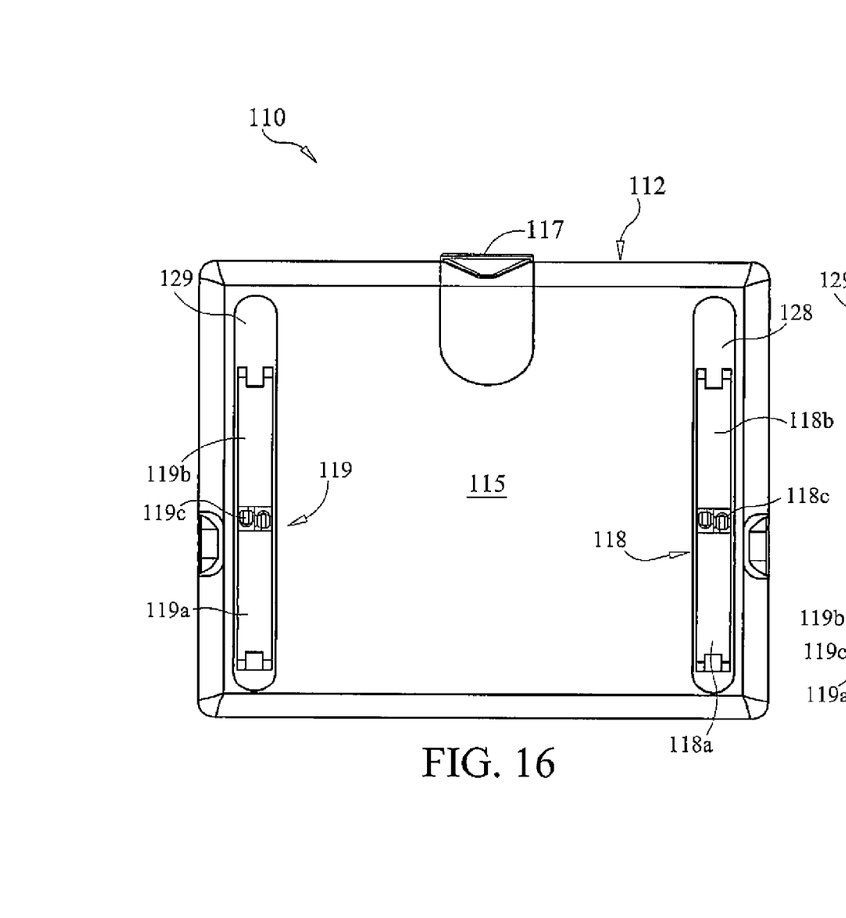
FIG. 16 is a bottom elevational view of the alternative embodiment of the adjustable projector stand with the stabilizer and legs refracted and illustrating the leg channels in accordance with the instant invention.
Figure 17:
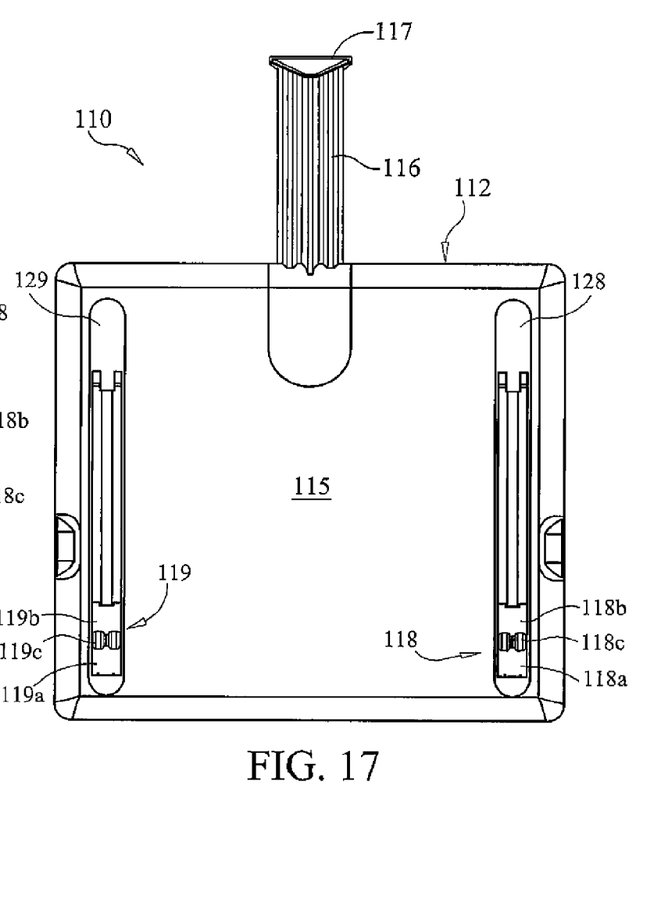
FIG. 17 is a bottom elevational view of the alternative embodiment of the adjustable projector stand with the stabilizer and legs extended and illustrating the leg channels in accordance with the instant invention.

With reference now to FIGS. 7-19, an alternative embodiment of the present invention which is motorized is shown. The projector stand 110 comprises a flat housing 112 having an upper surface or platform 114 and bottom surface 115 and secures a stabilizer arm 116, a first adjustable leg 118, a second adjustable leg 119, first electric controls 120-122 for retracting and extending the first leg 118, second electric controls 124-126 for retracting and extending the second leg 119, wherein the first and second electronic controls 120-126 are used to lower, raise and level the platform 114 based on the positioning of the legs 118, 19, a first leg drive system 130 disposed in a first channel 128 formed in the lower surface 115 of the housing 112, a second leg drive system 140 disposed in a second channel 129 formed in the lower surface 115 of the housing 112 and power supply 146 in electrical communication with the electronic controls and drive systems 130, 140 for supplying power to the drive systems 130, 140. The platform 114 is flat and supports a projector. The stabilizer 116 is manually retractable into the housing 112 for storage and transport of the projector stand 110 and extendable from the housing 112 for stabilizing the stand. The stabilizer 116 preferably comprises a rubber or rubber-like cap 117 on the end of the stabilizer 116 for preventing it from sliding. The legs 118, 119 are retractable into the channels 130, 140, respectively, for storage and transport of the stand 110 and extendable from the channels 130, 140, respectively, for raising, lowering and leveling the stand 110. When the stand 110 is placed on an unlevel support surface, such as a table top, the legs 118, 119 are placed in different positions relative to each other so as to adjust the height of their respective corners until the platform 114 is level, as shown in FIGS. 10-12. Referring to FIGS. 9-12, the first leg 118 comprises a first rod 118a pivotally connected to a second rod 118b by a hinge or hinge pin 118c and the second leg 118 comprises a first rod 19a pivotally connected to a second rod 119b by a hinge or hinge pin 118c.

With reference to FIGS. 14-19, the first drive 130 comprises a first motor 132 and first threaded rod 134 and the second drive 140 comprises a second motor 142 and second threaded rod 144. The first threaded rod 134 is fixed to the first motor 132 such that the rod 134 is rotated clockwise or counterclockwise depending on the direction of rotation of the motor 132 as dictated by the first set of electronic controls 120, 122. Likewise, the second threaded rod 144 is fixed to the second motor 142 such that the rod 144 is rotated clockwise or counterclockwise depending on the direction of rotation of the second motor 142 as dictated by the second set of electronic controls 124, 126. The first leg's 118 first rod 118a is fixed to the first channel 130 at the opposite end of the first motor 132. The second rod 118b is threadably mounted to the first threaded rod 134 such that it moves toward the fixed rod 118a when the threaded rod 134 is rotated in one direction to extend the first leg 118 and moves away from the fixed rod 118a when the threaded rod 134 is rotated in the opposite direction to retract the fist leg 118. Likewise, the first rod 119a of the second leg 119 is fixed to the second channel 140 at the opposite end of the second motor 142. The second rod 119b is threadably mounted to the second threaded rod 144 such that it moves toward the fixed rod 119a when the threaded rod 144 is rotated in one direction to extend the second leg 118 and moves away from the fixed rod 119a when the threaded rod 144 is rotated in the opposite direction to retract the second leg 119. The first electronic controls 120, 122 comprise a tactile elevating or "+" control 120 that electrically couples the power supply 146 to the first motor 132 to turn the rod 134 in one direction for extending the first leg 118 to raise one side of the stand 110 and tactile lowering "−" control 122 that electrically couples power 146 to the first motor 132 to turn the rod 134 in an opposite direction for 115 retracting the first leg 118 into the channel 130 to lower the one side. Likewise, the second electronic controls 124, 126 comprise a tactile elevating or "+" control 124 that electrically couples the power supply 146 to the second motor 144 to turn the second rod 144 in one direction for extending the second leg 119 to raise the opposite side of the stand 110 and tactile lowering "−" control 126 that electrically couples power 146 to the second motor 142 to turn the rod 144 in an opposite direction for retracting the second leg 119 into the second channel 140 to lower the same opposite side. When the stand 110 is placed on an unlevel surface the legs 118, 119 would be offset to level the platform 114.

Figure 18:
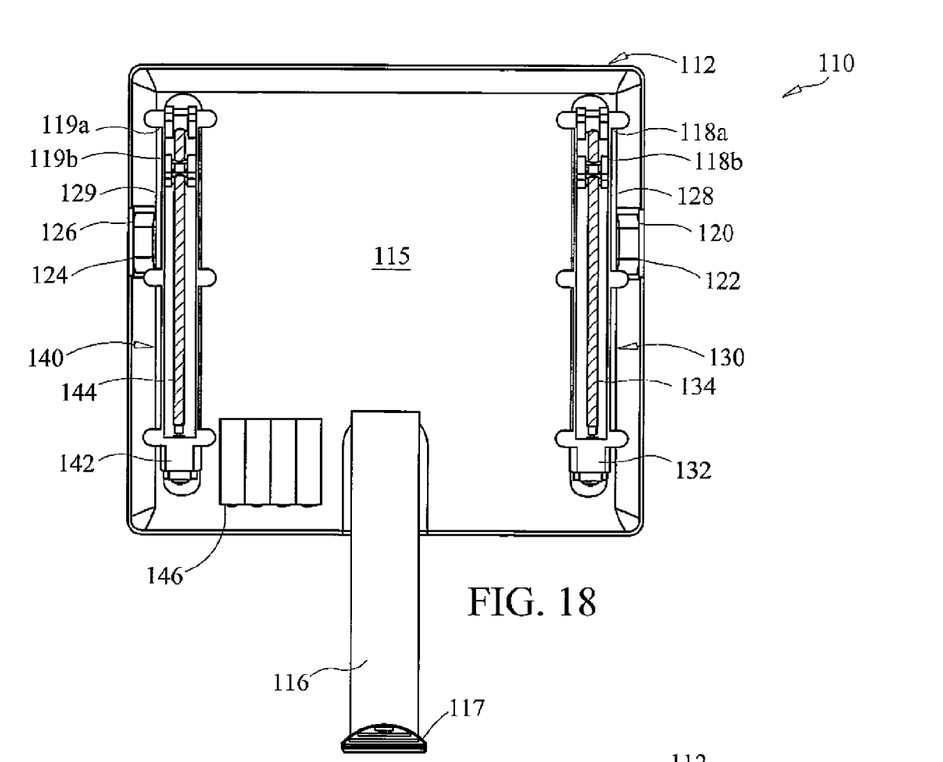
FIG. 18 is a bottom elevational partial cut-away view of the alternative embodiment of the adjustable projector stand with the stabilizer and legs extended and illustrating the leg channels and leg driver mechanisms in accordance with the instant invention.
Figure 19:
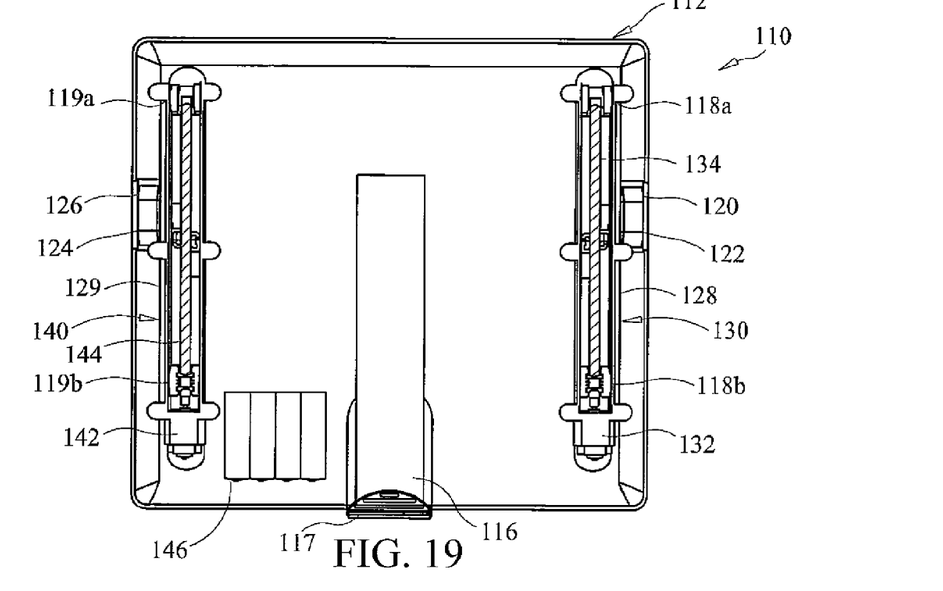
FIG. 19 is a bottom elevational partial cut-away view of the alternative embodiment of the adjustable projector stand with the stabilizer and legs retracted and illustrating the leg channels and leg driver mechanisms in accordance with the instant invention.

With reference to FIGS. 18 and 19, the power supply 146 is disposed in the bottom surface of the housing 112. The power supply 146 preferably comprises four AA batteries but may comprise other types of batteries or be adapted for receiving AC power.

Figure 20:
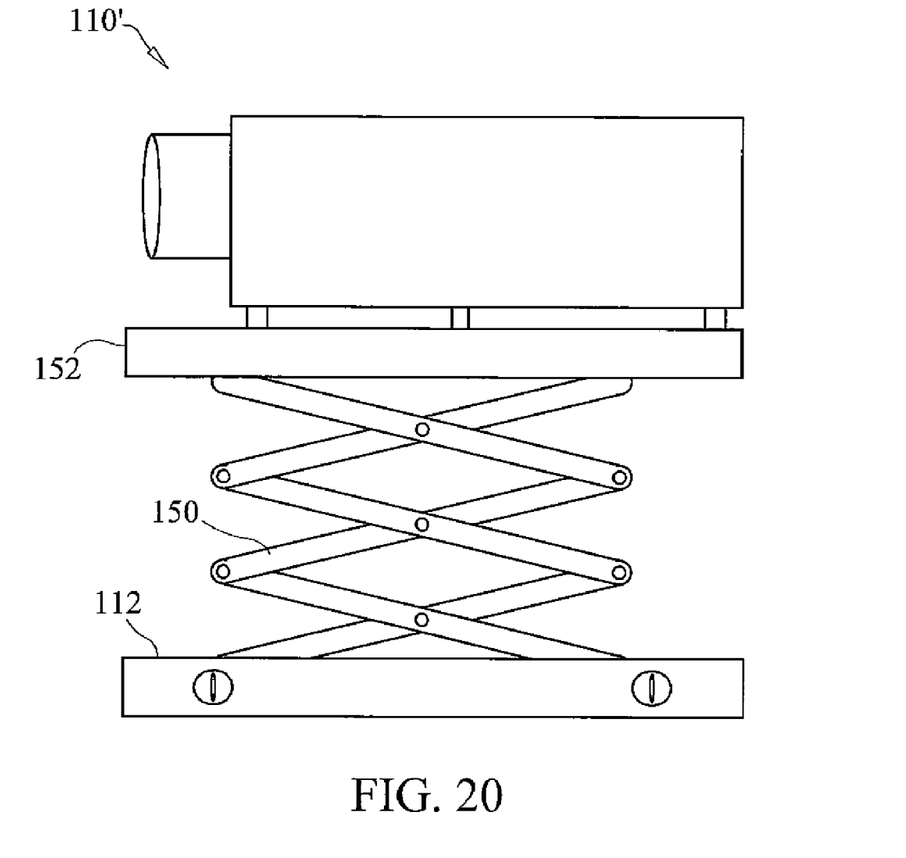
FIG. 20 is a side elevational view of another alternative embodiment of the adjustable projector stand in accordance with the instant invention.

With reference to FIG. 20, the alternative embodiment of the projector stand 110' comprises a lower rubber mat platform 112 joined to a top platform 152 by a collapsible scissor-like lifting and lowering mechanism 150. The scissor-like lifting and lowering mechanism 150 may be lifted by a motor or manually using similar crank levers to those used in the preferred embodiment.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. An adjustable projector stand device for balancing and setting the height for a projector, said device comprising:
    a platform having a top surface and bottom surface;
    a first channel defined in said bottom surface;
    a second channel defined in said bottom surface;
    a first leg having a first rod and second rod pivotally joined and supported in said first channel;
    a second leg having a first rod and second rod pivotally joined and supported in said second channel;
    first means, in mechanical communication with said first leg, for extending and retracting said first leg; and
    second means, in mechanical communication with said second leg, for extending and retracting said second leg.

2. A device as recited in claim 1, wherein:
    said first means for extending and retracting said first leg comprises a first threaded rod which is in rotatable communication with said first rod of said first leg; and said second means for extending and retracting said second leg comprises a second threaded rod which is in rotatable communication with said second rod of said second leg.

3. A device as recited in claim 2, further comprising:

a first means for rotating said first threaded rod; and a second means for rotating said second threaded rod.

4. A device as recited in claim 3, wherein:

said first means for rotating said first threaded rod comprises a knob in mechanical communication with said first threaded rod; and said second means for rotating said second threaded rod comprises a knob in mechanical communication with said second threaded rod.

5. A device as recited in claim 3, wherein:

said first means for rotating said first threaded rod comprises a motor in mechanical communication with said first threaded rod; and said second means for rotating said second threaded rod comprises a motor in mechanical communication with said second threaded rod.

6. A device as recited in claim 5, further comprising:

a first button electrically connected to said first motor for raising said first leg;

a second button electrically connected to said first motor for lowering said first leg;

a third button electrically connected to said second motor for raising said second leg; and a fourth button electrically connected to said second motor for lowering said second leg.

7. A device as recited in claim 1, further comprising a stabilizing arm pivotally joined to said platform.

* * * * *